United States Patent
Kausik

(10) Patent No.: US 8,161,538 B2
(45) Date of Patent: Apr. 17, 2012

(54) STATEFUL APPLICATION FIREWALL

(75) Inventor: Balas Natarajan Kausik, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1276 days.

(21) Appl. No.: 11/222,402

(22) Filed: Sep. 8, 2005

(65) Prior Publication Data

US 2006/0059550 A1 Mar. 16, 2006

Related U.S. Application Data

(60) Provisional application No. 60/609,419, filed on Sep. 13, 2004.

(51) Int. Cl.
*H04L 29/06* (2006.01)

(52) U.S. Cl. ............ 726/11; 370/351; 370/430; 705/79; 709/238; 709/244; 713/153; 713/154

(58) Field of Classification Search ............... 726/11
See application file for complete search history.

(56) References Cited

U.S. PATENT DOCUMENTS

| | | | | | |
|---|---|---|---|---|---|
| 5,706,507 | A | * | 1/1998 | Schloss | 709/225 |
| 5,870,562 | A | * | 2/1999 | Butman et al. | 709/238 |
| 5,951,643 | A | * | 9/1999 | Shelton et al. | 709/227 |
| 6,092,194 | A | * | 7/2000 | Touboul | 726/24 |
| 6,141,759 | A | * | 10/2000 | Braddy | 726/14 |
| 6,279,001 | B1 | * | 8/2001 | DeBettencourt et al. | 1/1 |
| 6,286,001 | B1 | * | 9/2001 | Walker et al. | 707/697 |
| 6,571,256 | B1 | * | 5/2003 | Dorian et al. | 726/2 |
| 6,640,307 | B2 | * | 10/2003 | Viets et al. | 726/15 |
| 6,804,780 | B1 | * | 10/2004 | Touboul | 713/181 |
| 6,947,404 | B1 | * | 9/2005 | Zalka | 370/338 |
| 7,260,840 | B2 | * | 8/2007 | Swander et al. | 726/13 |
| 7,707,628 | B2 | * | 4/2010 | Saito | 726/11 |
| 7,934,253 | B2 | * | 4/2011 | Overcash et al. | 726/22 |
| 7,941,830 | B1 | * | 5/2011 | Painter et al. | 726/5 |
| 2002/0065912 | A1 | * | 5/2002 | Catchpole et al. | 709/224 |
| 2003/0023873 | A1 | * | 1/2003 | Ben-Itzhak | 713/201 |
| 2003/0212756 | A1 | * | 11/2003 | Kuroda | 709/217 |
| 2004/0243847 | A1 | * | 12/2004 | Way | 713/201 |
| 2006/0059550 | A1 | * | 3/2006 | Kausik | 726/11 |
| 2006/0288220 | A1 | * | 12/2006 | Pennington et al. | 713/176 |
| 2007/0022474 | A1 | * | 1/2007 | Rowett et al. | 726/11 |

* cited by examiner

*Primary Examiner* — Farid Homayounmehr

(74) *Attorney, Agent, or Firm* — Schwegman, Lundberg & Woessner, P.A.

(57) ABSTRACT

A method and system to protect web applications from malicious attacks is described. A stateful means of distinguishing between valid (e.g., harmless) and invalid (e.g., harmful) accesses is provided. A request from a content browser for content from an application server is forwarded by a firewall to the application server if it includes a URL that was previously transmitted from the application server. The firewall performs a security evaluation of the request if the URL of the request was not previously transmitted from the application server.

12 Claims, 3 Drawing Sheets

STATEFUL APPLICATION FIREWALL

RELATED APPLICATION

This application claims priority from a provisional application entitled: "STATEFUL APPLICATION FIREWALL", filed on Sep. 13, 2004, Ser. No. 60/609,419, the entire contents of which is included herein by reference.

TECHNICAL FIELD

This application relates to protecting web applications from malicious attacks.

BACKGROUND

Web applications must be accessible to users yet impervious to attack from malicious hackers, or from inadvertent users whose desktop computers have been compromised by worms and viruses.

Consider a web application such as online banking that is accessible to a large number of users. The application infrastructure is installed at a data center and encased from the internet by a network firewall. The network firewall disables traffic on all TCP/IP (Transmission Control Protocol/Internet Protocol) ports except for the ports that carry HTTP (HyperText Transfer Protocol) and HTTPS (an HTTP that requires a Secure Sockets Layer) traffic, ports 80 and 443 typically. Malicious attackers may mount attacks via HTTP or HTTPS and the network firewall cannot protect against those. In addition, users with compromised desktops can inadvertently attack the application when they visit it. In either case, the operator of the application must take steps to protect the application from attack.

Some of these attacks may be infrastructure attacks. That is, the attacks target vulnerabilities in the infrastructure of the application. For example, the web server running the application may have vulnerabilities potentially subject to attacks. This was the case with recent worms such as CodeRed or Nimda. In other cases, the application itself could have vulnerabilities. For example, requesting a malformed URL (Uniform Resource Locator) of an application could cause the application to become unstable or vulnerable to unauthorized access to confidential information. Protecting the application and/or its infrastructure from these sorts of attacks is the subject of many commercial products such as the ones from Teros, Sanctum and F5. These and other projects form a broad class of products called application firewalls.

An application firewall must be able to distinguish between authorized access and unauthorized access, and must be able to distinguish between a valid URL and an invalid URL. Current technology aims to distinguish between valid and invalid URL's by employing a training phase and a protection mode. During the training phase, the system learns a valid range of values of URL's, including parameters and cookie values associated therewith. Subsequently, during the protection mode, any URL that falls outside the learned range is denied. This approach is prone to false positives because legitimate users requesting legitimate URL's may be denied access, since it is impossible to capture the full range of valid URL's in any reasonable training period.

HyperText Transfer Protocol (HTTP) is the underlying protocol used by the World Wide Web. HTTP defines how messages are formatted and transmitted, and what actions Web servers and browsers should take in response to various commands. For example, when a user enters a URL in a browser the browser sends an HTTP command to a Web server directing it to fetch and transmit the requested Web page. HTTP is called a stateless protocol because each command is executed independently, without any knowledge of the commands that came before it.

SUMMARY

A method and system to protect web applications from malicious attacks is provided. Techniques for an automated classification of URL requests as harmful or harmless are disclosed herein. These techniques are stateful because the context of each request is considered in the classification, and thus, may result in significantly less classification errors. Other features will be apparent from the accompanying drawings and from the detailed description that follows.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

In the following detailed description of example embodiments, reference is made to the accompanying drawings which form a part hereof, and in which is shown by way of illustration specific embodiments in which the example method and system may be practiced. It is to be understood that other embodiments may be utilized and structural changes may be made without departing from the scope of this description.

A need exists for a stateful means of distinguishing between valid (e.g., harmless) and invalid (e.g., harmful) accesses. A stateful classification may also be referred to as context classification. A stateful classification of a URL generally impacts alone or more future URL's in the same user session, same TCP/IP connection, etc.

Figure 1:
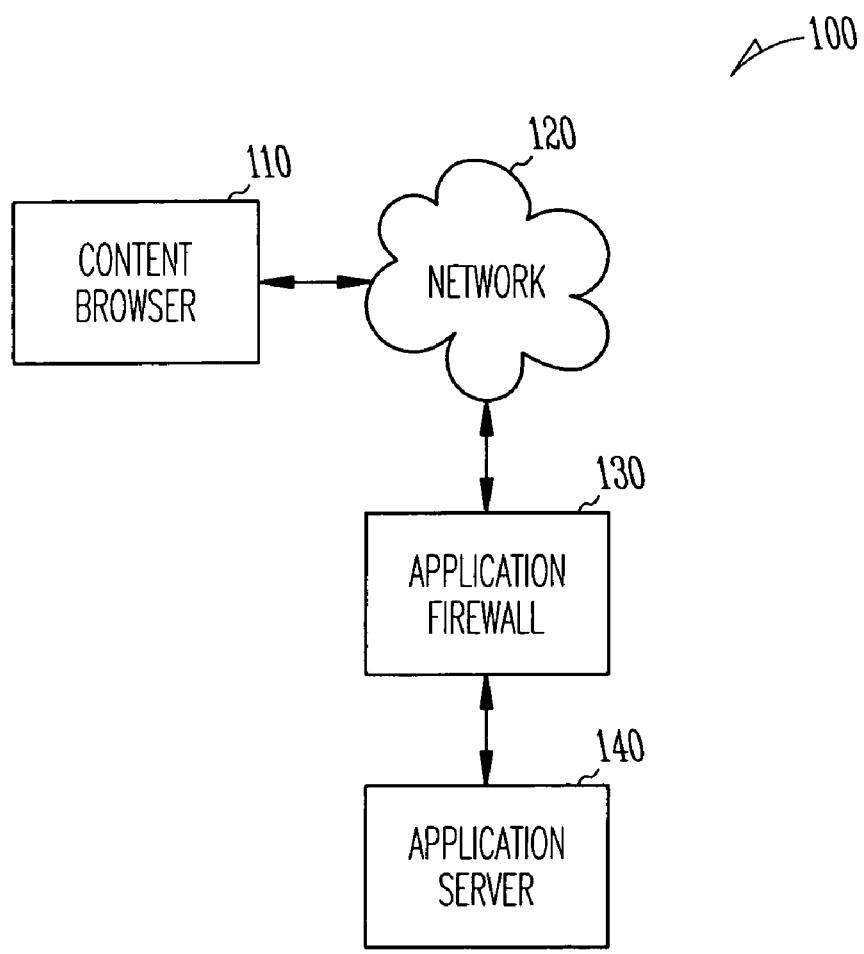
FIG. 1 is a block diagram of a network system of an example embodiment.

FIG. 1 illustrates an example network environment 100 in which various example implementations described herein may be applied. The environment 100 includes a content browser 110 connected over a network 120 to a communication node of an application firewall 130. The application firewall 130 has a second communication node that is in turn connected to an application server 140. In an example implementation, the application firewall 130 may reside in the same or different computing device as the application server 140 or be connected to the application server 140 in a distributed computing environment (e.g., via the network 120). In an embodiment, the application firewall is a set of instructions executed by a processor, as explained below.

When the content browser 110 makes an HTTP request to the application server 140, the application firewall 130 receives the request and classifies the request as harmful or harmless. Specifically, in an example implementation, the application firewall examines the following attributes of the HTTP request:

1. URL
2. parameters
3. source-IP
4. mime-type
5. cookie
6. headers
7. HTTP-method
8. Body or content The application firewall 130 accepts a configurable set of rules (for simplicity of explanation purposes only, hereinafter referred to as the "attribute rules") that specify properties of attributes, and policies on how to treat requests or responses that satisfy these rules. The attribute rules associated with the policies are typically configured to protect against malicious behavior. For example, the use of non-ASCII characters in URL names is generally considered outside the HTTP standard specification. Attributes may also be dynamically generated, configured and/or modified as will be described below. Example policies may specify actions such as:

1. Block the HTTP request entirely: In this case, the content browser may receive a response from the application firewall indicating an error condition. The firewall may also log the incident and/or alert the administrator.

2. Allow the HTTP request: In this case, the application firewall forwards the request to the application server, receives the associated response and forwards the response to the content browser.

3. Pause the HTTP request: In this case, the application firewall delays the content browser's request for a predetermined or specified period of time. All further requests on the same connection are also delayed as a result. During the period of the pause, the application firewall preserves the context of all requests that are paused. Pauses are useful to thwart denial-of-service attacks where an attacker may make a large number of requests in a short period of time in an attempt to bring down the application.

4. Redirect the browser to an alternate HTTP request: In this case, the application firewall redirects the user to an alternate request, perhaps one indicating an error message. The alternate request URL is sent to the content browser, and the content browser thence may elect to pursue the alternate request which may be at an entirely different application.

5. Forward the browser to an alternate HTTP request: In this case, the application firewall initiates an alternate request to the application server. For example, the application firewall may determine that the request from the content browser is harmful, and may elect to terminate the user session with the application server by requesting the logoff URL.

In the foregoing example policies, actions (3) and (5) may be considered stateful because the classification of one request may impact all future requests in the same connection or session.

In one embodiment, the application firewall 130 may parse every response from the application server 140 to accumulate a list of URL's that are embedded in the content being sent from the application server 140. All such embedded URL's may be deemed "harmless" and may be accumulated in a "dynamic whitelist" attribute rule.

In an embodiment, if a user received a reference to a URL embedded in content sent from the application server 140, the user may request that same URL in an HTTP request, which will be allowed by the application firewall 130. The stateful nature of the foregoing enables a simplified configuration of the application firewall 130 in that its policies need only tackle two cases: (1) patently malicious requests that are outside the specification and are always to be denied; (2) requests that were embedded in outbound content and are always to be allowed as inbound requests later in the same session.

Figure 2:
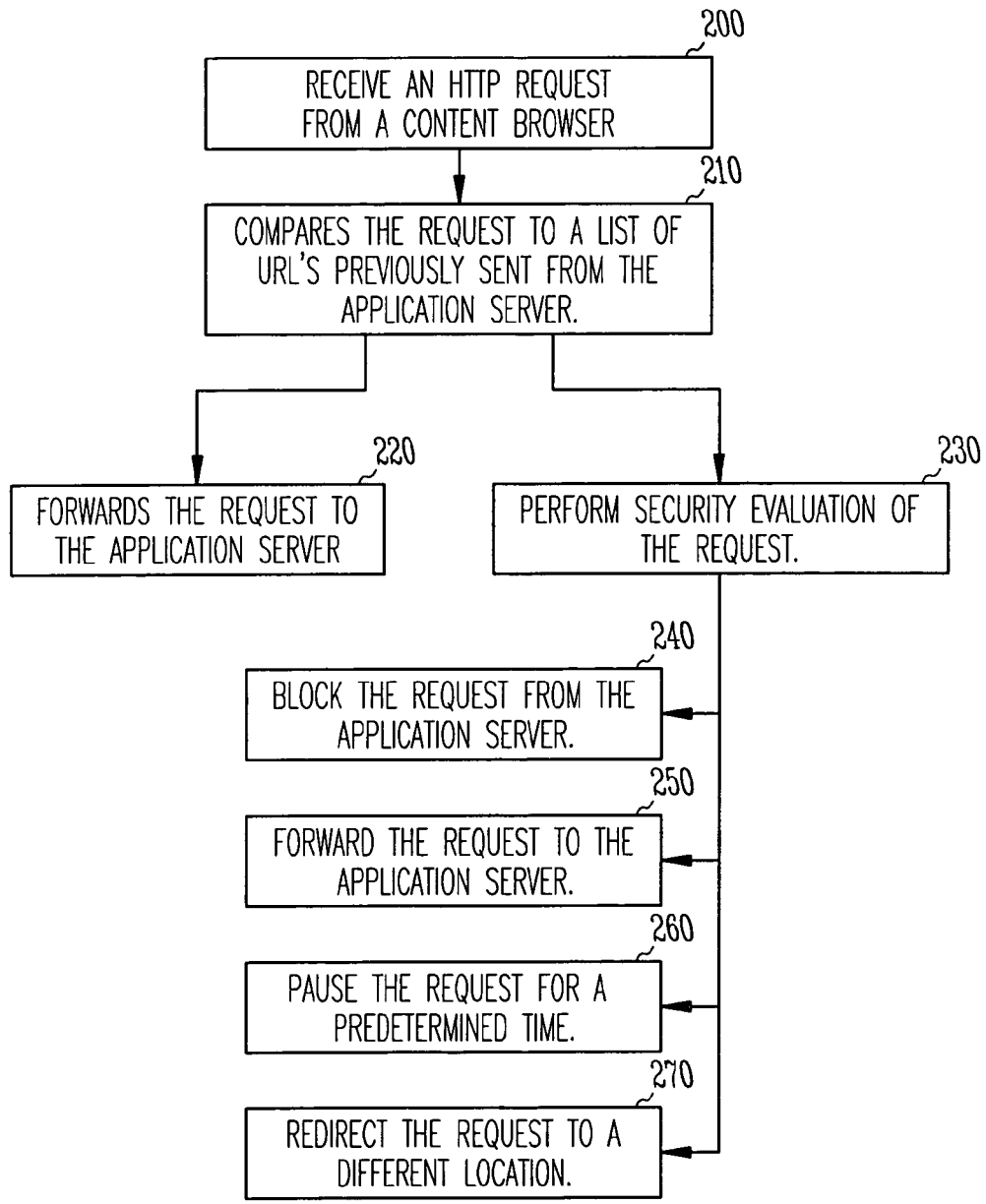
FIG. 2 is a flow chart of methods according to example embodiments.

FIG. 2 illustrates methods of the present invention. At step 200 the firewall 130 receives a request from a content browser 110 for content from the application server 140. The firewall, at step 210, compares the request to a list of Uniform Resource Locators (URL's) previously sent from the application server. If there is a match, the firewall forwards the request to the application server. If there is not a match to the list, a security evaluation of the request is performed at step 220.

Based upon the security evaluation, the firewall can block the request from the application server at step 240, forward the request to the application server at step 250, pause the request for a predetermined time at step 260, or redirect the request to a different location at step 270.

Those skilled in the art will understand that there are other attributes of requests to consider and other actions that may be taken by the application firewall in disposing of requests. Nevertheless, the basic teaching of stateful inspection can considerably improve the accuracy of classification of harmful and harmless attacks, as well as protect against denial-of-service attacks by enabling the classification of a request to impact all future requests in the same session.

The embodiments described herein may be implemented in an operating environment comprising software installed on a computer, in hardware, or in a combination of software and hardware. The software and/or hardware would typically include some type of computer-readable media which can store data and logic instructions that are accessible by the computer or the processing logic within the hardware. Such media might include, without limitation, hard disks, floppy disks, flash memory cards, digital video disks, random access memories (RAMs), read only memories (ROMs), and the like.

Figure 3:
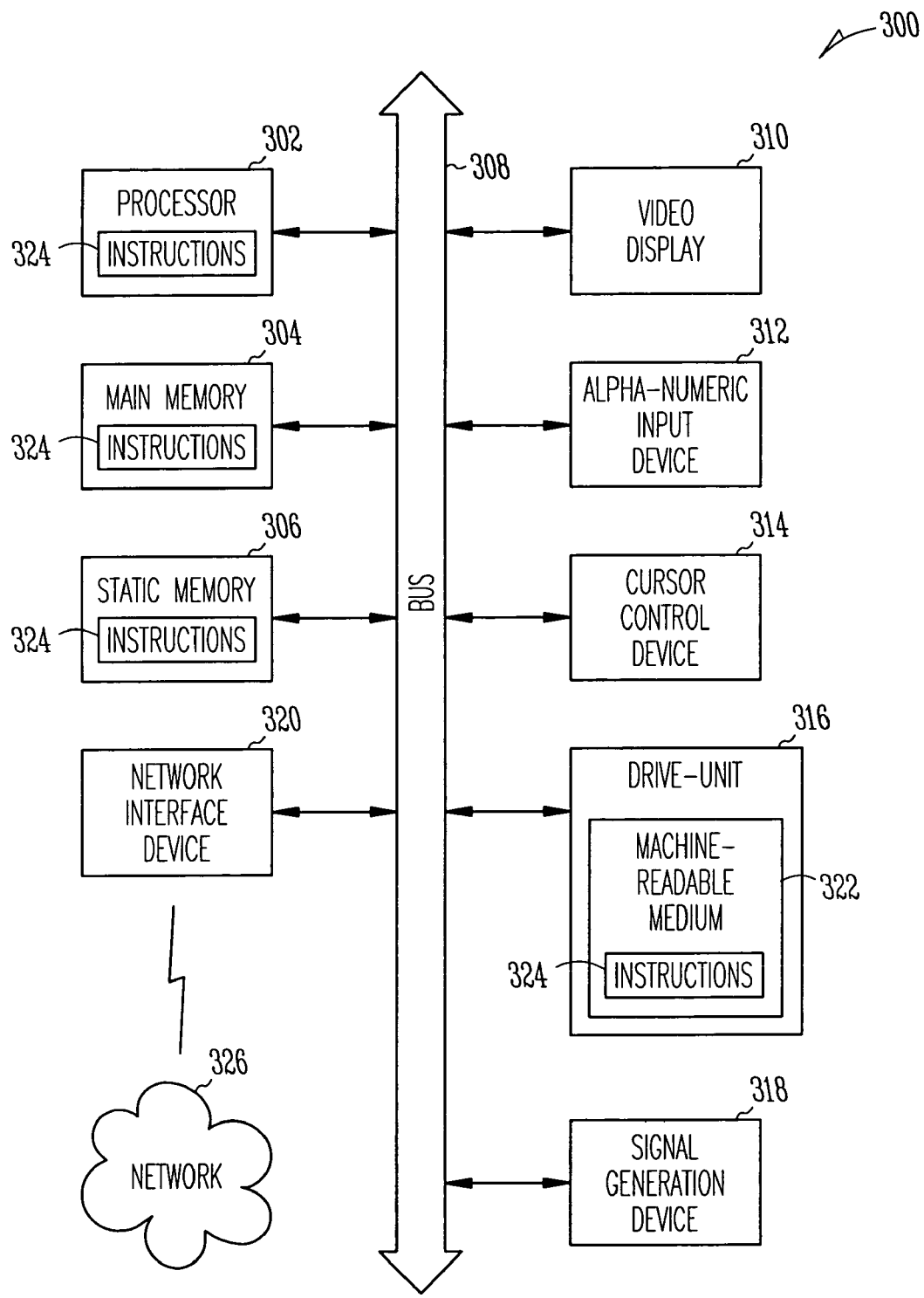
FIG. 3 illustrates a diagrammatic representation of a machine in the form of a computer system within which a set of instructions, for causing the machine to perform any one or more of the methodologies discussed herein, may be executed, according to example embodiments.

FIG. 3 shows a diagrammatic representation of machine in the example form of a computer system 300 within which a set of instructions, for causing the machine to perform any one or more of the methodologies discussed herein, may be executed. That is, the computer system 300 can be used in embodiments for the application firewall 130 and/or the application server 140.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 can also include an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
receiving a request for content from an application server by a remote browser, the request corresponding to a session of the remote browser;
at an application firewall located between the application server and the remote browser determining that a Uniform Resource Locator (URL) included in the request is absent from, a list of URL's previously sent from the application server in responding to previously received requests;
performing a security evaluation of the request in response to the determining that the URI, is absent from the list, the security evaluation being based on an attribute of the request, the security evaluation being performed by a computer using a processor of the computer; and
processing the request with a particular operation and a plurality of requests with the particular operation, the particular operation being based on the security evaluation of the request, the plurality of requests corresponding to the session of the remote browser and being received subsequent to the receiving of the request.

2. The method of claim 1, wherein the attribute is selected from a group consisting of:
the URL included in the request;
a parameter of the request;
a source Internet Protocol (IP) address of the request;
a Multipurpose Event Mail Extension (MIME) type of the request;
a browser cookie of the request;
a header of the request;
a Hypertext Transferred Protocol (HTTP) method of the request; and
information included in a body of the request.

3. The method of claim 1, wherein the particular operation includes es at least one of
blocking the request from the application server,
pausing the request for a predetermined time, or
redirecting the request to a different location.

4. A non-transitory machine-readable medium embodying instructions which, when executed by one or more processors of a machine, cause the machine to perform operations comprising:
receiving a request for content from an application server by a remote browser, the request corresponding to a session of the remote browser;
at an application firewall located between the application server and the remote browser, determining that a Uniform Resource Locator (URL) included in the request is absent from the list of URL's previously sent from the application server in responding to previously received requests;
performing a security evaluation of the request in response to the determining that the URL is absent from the list, the security evaluation being based on an attribute of the request;
processing the request with a particular operation and a plurality of subsequent requests with the particular operation, the particular operation being based on the security evaluation, the plurality of subsequent requests corresponding to the session of the remote browser and being received subsequent to the receiving of the request.

5. A method comprising:
maintaining a list of Uniform Resource Locators (URL's), the URL's being previously sent from an application server in responding to previously received requests;
receiving a Hyper Text Transfer Protocol (HTTP) request from a remote browser to access the application server, the HTTP request corresponding to a session of the remote browser;
at an application firewall located between the application server and the remote browser, determining that a URL included in the HTTP request is absent from the list of URL's previously sent from the application server;
performing a security evaluation of the HTTP request in response to the determining that the URL is absent from the list, the security evaluation being based on an attribute of the HTTP request, the security evaluation being performed by a computer using a processor of the computer; and
processing the HTTP request with a particular operation and a subsequent plurality of requests with the particular operation, the particular operation being based on the security evaluation of the HTTP request, the subsequent plurality of requests corresponding to the session of the remote browser and being received subsequent to the receiving of the HTTP request.

6. The method of claim 4, wherein the attribute is selected from a group consisting of:
the URL included in the HTTP request;
a parameter of the HTTP request;
a source IP address of the HTTP request;
a MIME type of the HTTP request;
a browser cookie of the HTTP request;
a header of the HTTP request;
an HTTP method of the HTTP request; and
information included in a body of the HTTP request.

7. The method of claim 4, wherein the particular operation includes at least one of
blocking the request from the application server,
pausing the HTTP request for a predetermined time, or
redirecting the HTTP request to a different location.

8. A non-transitory machine-readable medium embodying instructions which, when executed by one or more processors of a machine, cause the machine to perform operations comprising:
maintaining a list of URL's, the URL's being previously sent from an application server in responding to previously received requests;
receiving an HTTP request from a remote browser to access the application server, the HTTP request corresponding to a session of the remote browser;

at an application firewall located between the application server and the remote browser, determining that a URL included in the HTTP request is absent from the list of URL's previously sent from the application server;

performing a security evaluation of the HTTP request in response to the determining that the URL is absent from the list, the security evaluation being based on an attribute of the HTTP request; and processing the HTTP request with a particular operation and a subsequent plurality of requests with the particular operation, the particular operation being based on the security evaluation of the HTTP request, the subsequent plurality of requests corresponding to the session of the remote browser and being received subsequent to the receiving of the HTTP request.

9. An application firewall system comprising:

a processor coupled to communicate with a content browser and coupled to communicate with an application server, wherein the processor is configured to:

maintain a list of Uniform Resource Locators (URL's), the URL's being previously sent from the application server in responding to previously received requests;

receive an HTTP request from a remote browser to access the application server, the HTTP request corresponding to a session of the remote browser;

determine that a URL included in the HTTP request is absent from the list of URL's;

perform a security evaluation of the HTTP request in response to the determining that the URL is absent from the list, the security evaluation being based on an attribute of the HTTP request; and process the HTTP request with a particular operation and a plurality of requests with the particular operation, the particular operation being based on the security evaluation of the HTTP request, the plurality of requests corresponding to the session of the remote browser and being received subsequent to the receiving of the HTTP request.

10. The application firewall of claim 9 wherein the processor is shared with the application server.

11. A server comprising:

a network interface to interface the server to a network; and a processor configured to:

maintain a list of Uniform Resource Locators (URL's), the URL's being previously sent from the application server in responses to previously received requests;

receive a Hyper Text Transfer Protocol (HTTP) request from a remote browser to access the application server, the HTTP request corresponding to a session of the remote browser;

at an application firewall located between the application server and the remote browser, determine that a URL included in the HTTP request is absent from the list of URL's;

perform a security evaluation of the HTTP request in response to the determining that the URL is absent from the list, the security evaluation being based on an attribute of the HTTP request; and process the HTTP request with a particular operation and a plurality of requests with the particular operation, the particular operation being based on the security evaluation of the HTTP request, the plurality of requests corresponding to the session of the remote browser and being received subsequent to the receiving of the HTTP request.

12. The method of claim 1, further comprising determining a classification of the request, the classification being determined based on the security evaluation of the request; and wherein the particular operation is based on the classification of the request.

* * * * *

UNITED STATES PATENT AND TRADEMARK OFFICE
CERTIFICATE OF CORRECTION

| | |
|---|---|
| PATENT NO. | : 8,161,538 B2 |
| APPLICATION NO. | : 11/222402 |
| DATED | : April 17, 2012 |
| INVENTOR(S) | : Balas N. Kausik |

Page 1 of 1

It is certified that error appears in the above-identified patent and that said Letters Patent is hereby corrected as shown below:

In column 5, line 30, in Claim 1, delete "from," and insert -- from --, therefor.

In column 5, line 34, in Claim 1, delete "URI," and insert -- URL --, therefor.

In column 5, line 57, in Claim 3, after "includes" delete "es".

In column 6, line 43, In Claim 6, delete "claim 4," and insert -- claim 5, --, therefor.

In column 6, line 53, In Claim 7, delete "claim 4," and insert -- claim 5, --, therefor.

Signed and Sealed this
Third Day of July, 2012

David J. Kappos
*Director of the United States Patent and Trademark Office*